United States Patent
Elias et al.

(10) Patent No.: US 8,900,043 B1
(45) Date of Patent: Dec. 2, 2014

(54) STRUCTURED JIGSAW PUZZLES

(75) Inventors: George Skaff Elias, Redmond, WA (US); Richard Channing Garfield, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 185 days.

(21) Appl. No.: 13/480,266

(22) Filed: May 24, 2012

Related U.S. Application Data (60) Provisional application No. 61/490,283, filed on May 26, 2011.

(51) Int. Cl.
  *A63F 13/00* (2014.01)
  *A63F 9/24* (2006.01)

(52) U.S. Cl.
  USPC .............. 463/10; 463/23; 463/43; 273/153 R; 273/156

(58) Field of Classification Search
  USPC ............... 463/10, 23, 43; 273/153 R, 156
  See application file for complete search history.

(56) References Cited

U.S. PATENT DOCUMENTS

| | | | | |
|---|---|---|---|---|
| 5,643,084 A * | 7/1997 | Mirsky | ............. | 463/9 |
| 6,264,198 B1 * | 7/2001 | Stamper | ............. | 273/157 R |
| 6,452,515 B1 * | 9/2002 | Duquesnois et al. | ........ | 341/50 |
| 7,118,110 B2 * | 10/2006 | Kowalczyk | ........ | 273/272 |
| 2004/0090009 A1 * | 5/2004 | Mortimer | ........ | 273/299 |
| 2010/0109247 A1 * | 5/2010 | Cernansky et al. | ........ | 273/293 |

* cited by examiner

*Primary Examiner* — William M Brewster
*Assistant Examiner* — Ryan Hsu
(74) *Attorney, Agent, or Firm* — Novak Druce Connolly Bove + Quigg (57) ABSTRACT

A computer-generated puzzle game can enable any appropriate image (e.g., a still image, video, or animation) to be used as a puzzle image. The puzzle game can utilize a framework including a portion of the puzzle image such that the user can determine where to place the puzzle pieces without having to see a version of the final image, which can save display real estate as well as provide suspense and additional challenge for the user. The puzzle pieces also can include a portion of the image, such that the player can determine where the pieces are to be placed in the framework without having to worry about rotating or properly positioning the pieces, which can be difficult on at least certain computing devices.

22 Claims, 6 Drawing Sheets

STRUCTURED JIGSAW PUZZLES

CROSS-REFERENCE TO RELATED CASES

This application claims priority to U.S. Provisional Application Ser. No. 61/490,283, filed May 26, 2011, and entitled "Structured Video Jigsaw Puzzle Method and Apparatus," which is hereby incorporated herein by reference.

BACKGROUND

Jigsaw puzzles, typically physical objects made of paperboard or another such durable material, have entertained and educated puzzle players for decades. With the advent of personal computers, computer-generated pictorial jigsaw puzzles have also become popular among players of all ages. In conventional computer-generated pictorial jigsaw puzzles, a puzzle picture is electronically broken up into a set of puzzle pieces which are then scattered across an electronic viewing display. A player then manipulates the pieces on the display, such as by using a mouse or keyboard, to connect interlocking puzzle pieces together until the puzzle picture is unscrambled. While popular, these computer-generated pictorial jigsaw puzzle pictures are static representations similar to puzzle pictures made of durable material. As such, the computer-generated jigsaw puzzle image on each piece does not change while the game is being played. Further, existing computer-generated jigsaw puzzle games disadvantageously lack high quality sound effects, such as musical sequences, while the game is being played, which could significantly increase the level of excitement and interaction provided by the puzzle.

Moreover, to promote solvability, conventional jigsaw puzzles and existing computer-generated pictorial jigsaw puzzles typically present an image of the final picture to provide the player sufficient frame of reference to begin piecing together the puzzle. A disadvantage of such an approach is that the player usually knows from the outset what the player is creating, and there is no depth of mystery or intrigue to motivate solving the puzzle. Conventional jigsaw puzzles and existing computer-generated puzzles generally use a wide array of unique puzzle shapes such that the shape of the puzzle piece itself provides some clue to solving the puzzle. One disadvantage of using a wide array of puzzle piece shapes is that the interface can be cumbersome since computer software must make a judgment as to when the player has moved a piece close enough to the proper position and orientation that the piece "fits." Fit tests often become unintended and even frustrating fine motor skill challenges for the player, rather than the mental challenge the player is seeking. Another disadvantage of using a wide array of puzzle piece shapes is that a significant portion of screen space must be dedicated to viewing the unassembled pieces. This approach typically requires the player to view all the unassembled pieces and to simultaneously provide a viewing area equal to the finished puzzle.

BRIEF DESCRIPTION OF THE DRAWINGS

Various embodiments in accordance with the present disclosure will be described with reference to the drawings, in which:

FIGS. 3(*a*) and 3(*b*) illustrate example states of a first structured puzzled that can be provided in accordance with various embodiments;

FIGS. 4(*a*) and 4(*b*) illustrate example states of a second structured puzzled that can be provided in accordance with various embodiments;

DETAILED DESCRIPTION

Systems and methods in accordance with various embodiments of the present disclosure may overcome one or more of the aforementioned and other deficiencies experienced in conventional approaches to providing puzzle games to users. In particular, various embodiments provide computer-generated jigsaw puzzles that can include various types of images, including video or animation, among other such options. The ability to utilize moving or changing puzzle images can provide increased entertainment, education, and interaction, among other such aspects. Such a puzzle can also provide high quality sound effects, haptic feedback, or other output that can enhance the puzzle-solving experience. The puzzles can be provided through an interface provided by an application, for example, wherein the interface can provide a framework for the puzzle pieces that can provide sufficient indicia to enable the player to solve the puzzle without having to also view an image of the end image or sequence. Such an approach provides some suspense for the user, and can conserve real estate in the interface, which can be particularly important for devices with small display screens such as smart phones. The framework can also enable a relatively small, or even single, number of puzzle piece shapes and sizes to be used. The revelation of parts of the image to be completed along a grid or framework can also help to simplify the interface, as a small number of randomly selected pieces can be concurrently displayed to the player at any time, without all the unused pieces having to be displayed. The user can determine where to place each piece in the final picture independently, based at least in part upon the surrounding image information in the framework. In addition to saving a significant amount of space, such an approach can help to eliminate tedious piece sorting.

Many other alternatives and variations are described and suggested below in relation to at least some of the various embodiments.

Figure 1:
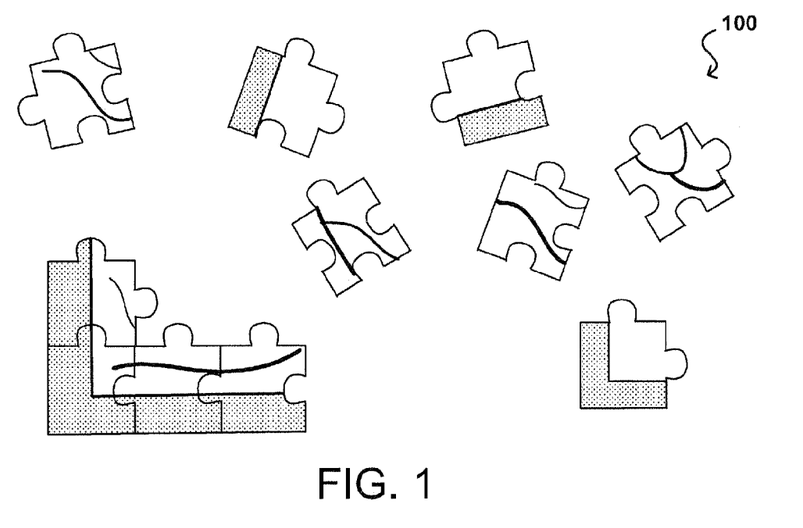
FIG. 1 illustrates an example of a conventional puzzle of the prior art.

FIG. 1 illustrates a portion of an example jigsaw puzzle 100 of the prior art. As known, the puzzle typically contains a set of pieces that are originally separated, and must be put together in a certain way such that the pieces fit properly together, and the resulting image makes sense. In at least some puzzles, each puzzle piece has a unique shape such that the pieces can only be connected in a designated way. Such a puzzle typically comes with a box (or in the case of a computer-generated puzzle, an interface panel) that includes a copy of the resulting image when the pieces are properly connected, in order to help guide the user to properly assemble the puzzle and locate pieces that likely fit together based on the image as well as the shapes of the individual pieces.

As mentioned, jigsaw puzzles for electronic media follow the same basic approach. In many cases, the puzzle pieces must be selected individually, then rotated and moved into potentially the correct place and positioned with sufficient accuracy that the game can determine whether the piece is in the correct place. Such an approach can be relatively difficult, particularly for video game input devices with analog control buttons or touch screens where the user must make complex motions with a finger that can be relatively large with respect to the screen. The image manipulation thus can be significantly more difficult in at least some situations than that for traditional physical puzzles.

Figure 2:
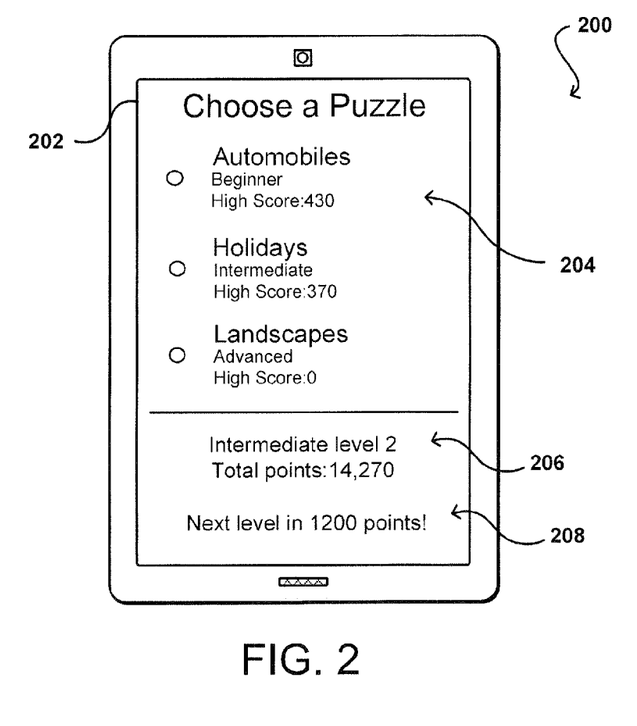
FIG. 2 illustrates an example interface for a structured puzzle that can be utilized in accordance with various embodiments.

Approaches in accordance with various embodiments can provide the user with the visual and cognitive challenges of traditional jigsaw puzzles without the limitations of physical piece manipulation on a digital image display where the screen space can be relatively limited, or otherwise valuable. FIG. 2 illustrates an example of an initial interface state 200 that can be presented to a user on a display screen 202 of a computing device in accordance with various embodiments. In this example, a user is presented with one or more options 204 for playing various types of puzzle. In at least some embodiments, a user might have to first log in or provide identifying information, at least where the user wants the ability to track scores, completed puzzles, puzzle status, or other such information over time or between sessions, among other such options. In this interface the user can select to play a type of puzzle that has an associated level of difficulty. For example, the user can select an automobile category that has a beginner skill level, a holiday category that has an intermediate skill level, and a landscape category that has an advanced skill level. The user in some embodiments can have the option to choose the type of images for each skill level, type of level for each type of image, etc. In this example, the user must unlock each skill level and/or additional type of puzzle by completing puzzles of other types or levels to accumulate a specified score, etc. The initial setup display can also include other information 206, such as the current level of the user, a current point total earned by the user, or other such information. The screen also can display the number of points 208 needed to unlock the next level or puzzle, among other such options. In at least some embodiments, points are earned by completing puzzles, where the number of points can be affected by the number of penalty points, bonus points, amount of time in which puzzles are completed, and other such information.

Figure 3A:
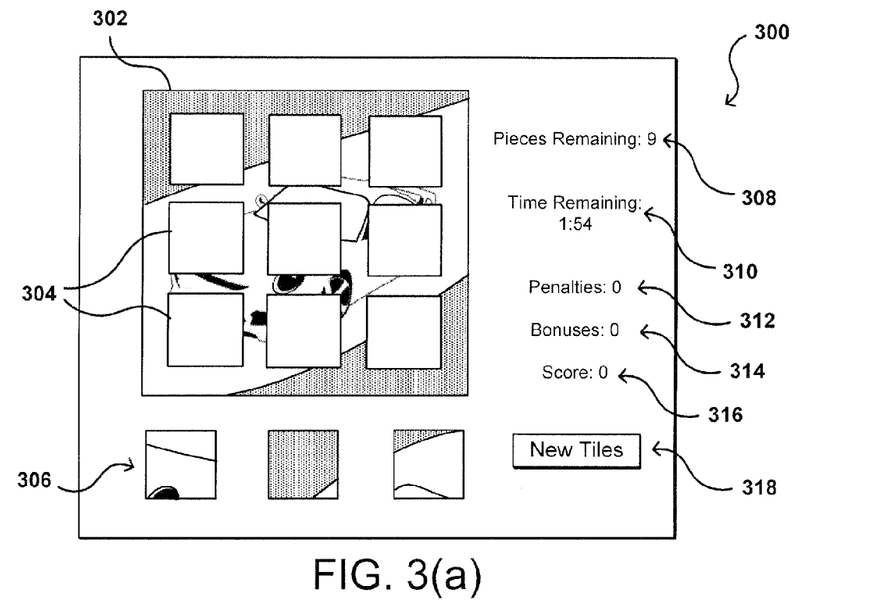

FIG. 3(a) illustrates an example of a puzzle game 300 that can be rendered for display to a user in accordance with various embodiments. In this example, the puzzle framework 302 is displayed. Within the framework is an array of openings 304 where a user can place puzzle pieces, referred to herein as "tiles," in an attempt to complete or solve the puzzle. A subset of the available tiles 306 are displayed in this embodiment, in order to reduce the amount of real estate needed and/or increase the size with which each tile can be displayed. Although each tile in this embodiment has the same shape, the framework 302 displays a sufficient amount of the surrounding image or video such that the user can determine where each of the tiles 306 should be placed without having to view a version of the completed puzzle or view each of the other pieces. In this example, the user has not yet successfully placed any of the pieces. The interface for the puzzle application (which can be executing locally to, or remotely from, the device displaying the puzzle) can display additional information as well. For example, the interface can display an indication 308 of the number of pieces or tiles that have yet to be properly placed for the current puzzle. The interface also can display the amount of time remaining 310, the number of penalties 312 received on the current puzzle, the number of bonuses 314 received on the current puzzle, and the current score 316 for the current puzzle. Various other types of information can be displayed as well within the scope of the various embodiments.

As discussed, the image displayed with the puzzle can include a still image, a rotating image, a stereoscopic image, a video image or segment, or an animation, among other such options. In some embodiments, a user might provide images or video files that can be analyzed to determine framework and tile portions, in order to generate an appropriate puzzle. In some embodiments, the application can be configured to pull images and video files from one or more places specified by a user, such as a user's video folder and the like. When the content is video or animation, for example, the image can change with the video or animation such that the content displayed for the framework 302 and the tiles 304 reflects the relevant portions of the video, and the user can determine the location of a specific tile based on the view at the current point in the video. In cases where an image or video might have portions where the tiles do not have clear destinations, the user can be provided with an option 318 to receive a new selection of times 306 remaining for that puzzle, in order to hopefully obtain one or more tiles with more clear destinations. The thickness of the lines of the "grid" of the framework can be selected such that enough of the image can be seen to enable the user to determine the appropriate tile to be placed adjacent a grid line based at least in part upon the portion of the image displayed at that grid line. In some embodiments the thickness of the lines can decrease with increased difficulty or skill level, or can be set dynamically based at least in part upon the size or location of features in the image, among other such options, in order to provide an appropriate amount of contextual information for the present puzzle. The thicker grid lines also enable the number of concurrently displayed tiles to be decreased, as the user can determine the appropriate location for a tile based on the image portion displayed at the grid lines, without having to see the other tiles. Restricting the number of pieces displayed to the user without impairing puzzle solvability can make jigsaw puzzles more compatible with relatively small displays or limited input devices, among other such options. The providing of a contextual frame of reference via the grid lines enables the displayed tiles 306 to be instantly usable even where those tiles may bear no direct relationship to each other.

The tiles 306 that are displayed can be selected randomly or using an appropriate selection process, which might determine a uniqueness of features in each the image portion of each tile and then select tiles with more or less unique features based at least in part upon the difficulty or skill level. The number of pieces displayed can be fixed or can vary based on a number of factors as well, such as the skill level, screen resolution, user specification, etc. Such an approach also saves the computer the process of sorting the tiles for the player, in addition to saving screen real estate. In this example the tiles are all substantially the same shape and size, but it should be understood that the tiles can have various shapes (e.g., rectangles, triangles, ellipses, stars, or logos) and sizes (e.g., small, large, or variable).

Play proceeds when a user selects one of the displayed tiles 306, such as by touching the location of the tile on a touch screen or maneuvering a cursor to a location of the tile, for example, and moving that tile to an open location 304 in the puzzle framework 302. In at least some embodiments, feedback can be provided to the user indicating which tile has been selected, such as by highlighting or otherwise manipulating the selected tile. In some embodiments the tile can snap from open grid location to open grid location as the user moves the tile across the puzzle framework. In other embodiments, the tile might move substantially continuously until dropped onto one of the openings by the user. Various other approaches can be used as well. When the player places or "releases" one of the tiles into one of the grid openings 304, the interface can let the player know in some embodiments whether the placement was correct. For example, the interface might cause the computing device to emit a specified sound or display a specified message or indication. Further, a new tile can be selected and displayed (as long as there are additional tiles yet to be displayed). If the user has selected an incorrect location for the tile, the tile can be returned to the user's rack or selection of tiles 306 and a notification such as a sound or message can similarly be provided. In at least some embodiments, the user might also be assessed a penalty for an improper selection, which can reduce or otherwise affect the user's score (or the amount of time remaining or another such factor) for the current puzzle. As the player correctly places tiles, is assigned penalties, or otherwise progresses through the puzzle, the information displayed can be updated accordingly.

Figure 3B:
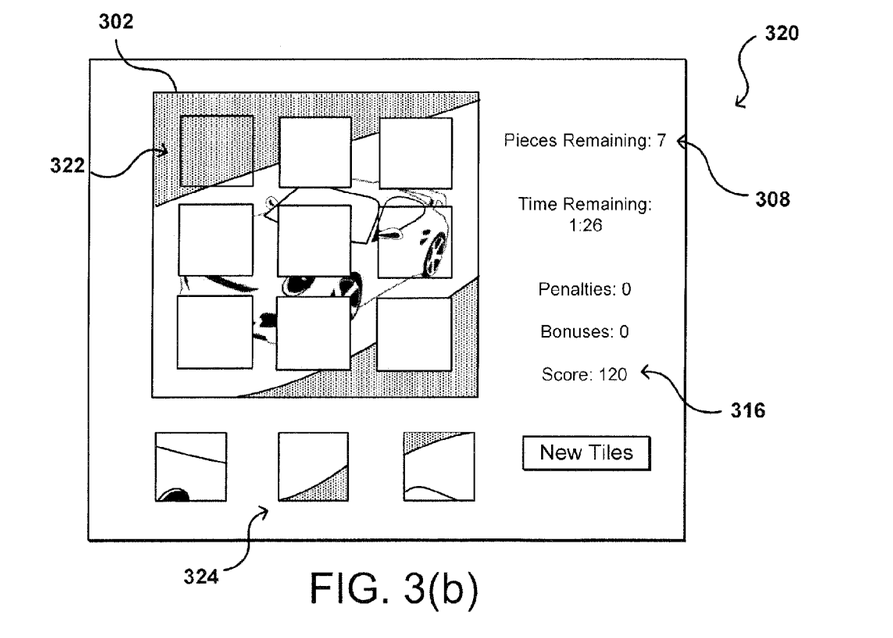

For example, FIG. 3(b) illustrates a state 320 of the puzzle game wherein a user has correctly placed two tiles, which show up as filled-in regions 322 of the framework. As can be seen, the number of pieces remaining 308 has been decreased, and the score 316 for the user updated. Also, at least one new tile 324 is displayed in response to the user successfully placing the pair of tiles.

Figure 4A:
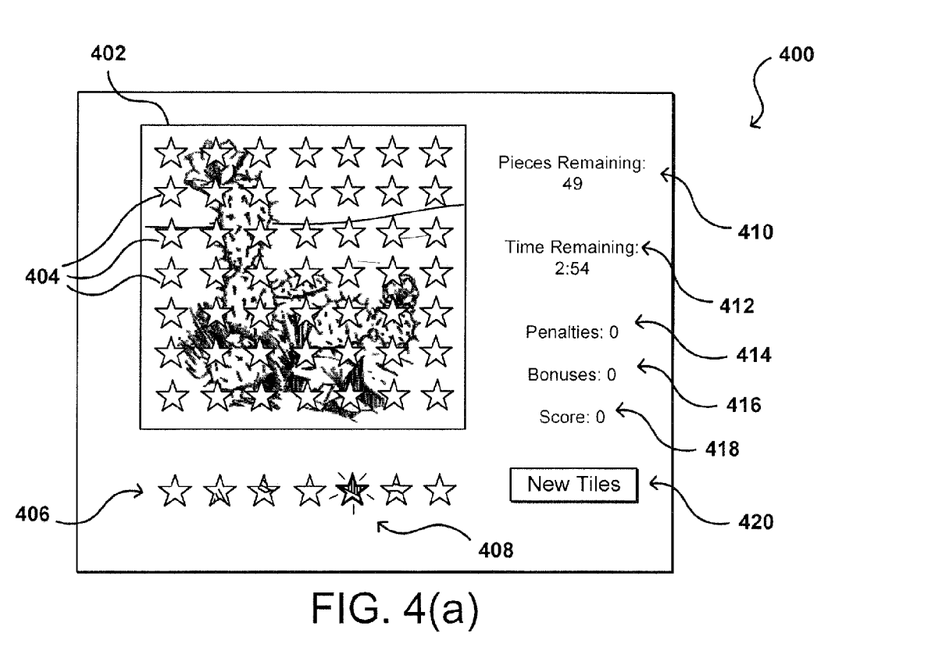

FIG. 4(a) illustrates an example state 400 of another puzzle that can be provided in accordance with various embodiments. In this example, a different image has been selected to be displayed with the framework 402 and the tiles 406. Also, a different number, shape, and size of the tiles 406 has been selected, as may correspond to a skill level, difficulty level, or other such value. The openings 404 in the grid, puzzle performance information 410, 412, 414, 416, 418, and other such options or information 420 can be provided with the puzzle as well. In this example, one of the displayed tiles 408 is highlighted or otherwise indicated to be a bonus tile. One or more tiles might periodically be indicated as a bonus tile, as may also include a special sound or animation, among other such options. The tile might act as a bonus tile only for a limited amount of time. When the bonus tile is properly inserted into the puzzle framework 402, the player can receive additional points, additional time, and/or another such bonus. As discussed, play can continue until the player successfully completes the puzzle, or until the player runs out of time, among other such options. Again, the puzzle image can include image, video, or animation, for example, which can reflect content such as cartoons, commercials, theatrical productions, movie trailers, music videos, or other such content.

Figure 4B:
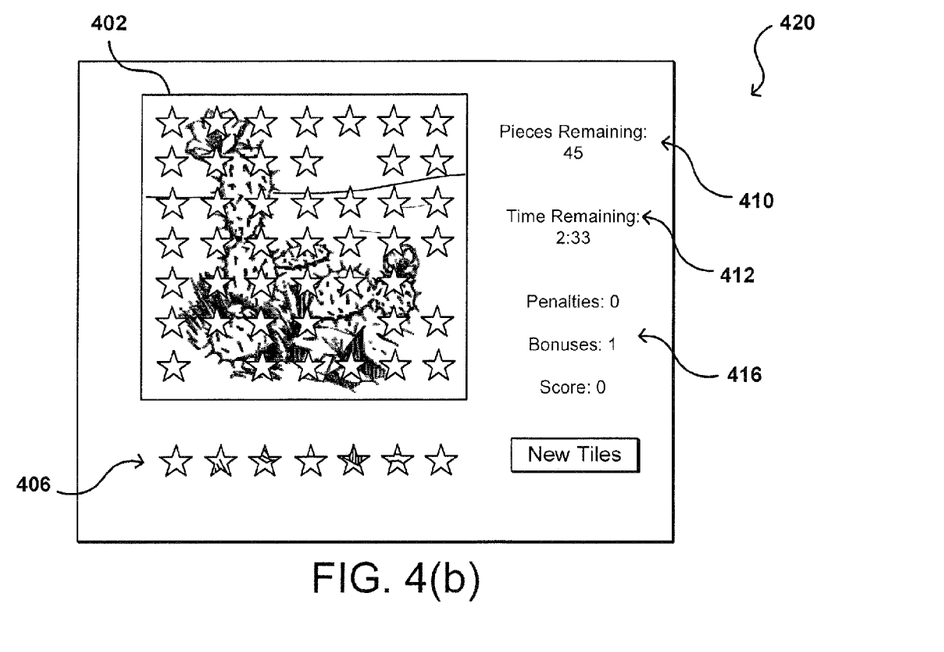

FIG. 4(b) illustrates a state 420 of the puzzle after a number of pieces have been placed. As can be seen, a new selection of tiles is displayed and the scoring and progress information has been updated. Further, more of the puzzle image can be seen, which can provide the user with the opportunity to begin to guess what is shown by the puzzle image. The slow revealing of the image adds to the visual surprise of image revelation with the standard jigsaw puzzle enjoyment, which can be beneficial in the promotion and marketing of certain images. It also should be understood that the puzzle grid or framework 402 need not take the form of a rectangular grid, but can include spiral grid systems, wavy grid systems, radial or circular grid systems, three-dimensional grids, and the like.

Referring back to the "bonus" tile 408 described with respect to FIG. 4(a), such an approach also can be used to designate tiles that temporarily function as "power-ups" or provide other such additional functionality. For example, a power up might cause the tiles to be shuffled in response to the power up being correctly placed, the puzzle image might be temporarily revealed, the grid might be temporarily enlarged such that more of the puzzle image is revealed and tiles are easier to place, a player's score might be multiplied over a period of time so the user is rewarded for fast play, etc.

Figure 5:
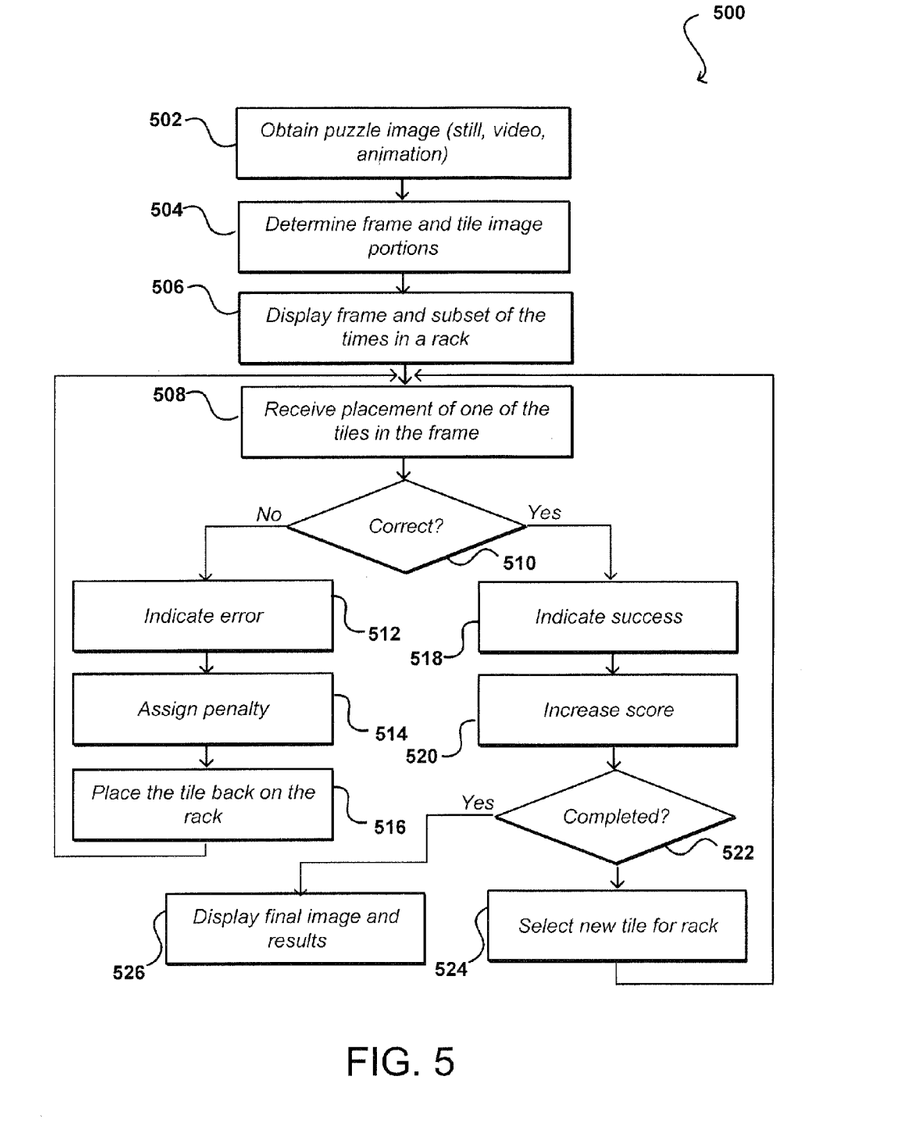
FIG. 5 illustrates an example process for providing a structured puzzle that can be utilized in accordance with various embodiments.

FIG. 5 illustrates an example process 500 for providing a structured puzzle that can be used in accordance with various embodiments. In this example, an image is obtained 502 that is to be used for the puzzle image. As discussed, this can include a single still image, set of still images, three-dimensional image, video image, animation, or other such image. Further, the image can be obtained from any appropriate source, such as the provider of the puzzle software, a third party vendor, the player, etc. The puzzle software can determine 504 the portions of the image that correspond the puzzle frame and the tiles for that frame. The frame, with the selected image portion, and a subset of the tiles then can be displayed 506 on a display screen for manipulation by the player. When indication regarding placement of one of the tiles in an opening of the frame is received 508, a determination can be made 510 as to whether the tile has been placed in the correct location in the frame. If not, the software can indicate 512 an error, such as by causing the device to emit a sound or display a graphic indicating an incorrectly placed tile. In at least some embodiments a penalty can be assessed 514, which can affect the player's score, the time remaining, or another such game value. The tile (or a different tile) then can be placed back on the rack 516, and the game can continue.

If the tile was successfully placed, the puzzle game can indicate 518 success, such as by causing the device to emit an appropriate sound or display an appropriate graphic, among other such options. The game can also increase 520 the player's score accordingly. If the puzzle has been completed 522, the final puzzle image and results of the game can be displayed 526. If unplaced tiles remain, a new tile can be selected 524 for the rack and the game can continue until all tiles are successfully placed, time runs out, or another such end action occurs.

Such an approach enables almost any image to serve as an interesting puzzle challenge. Puzzle images can include images of object, landscapes, people, events, etc. Such an approach also can make almost any moving image solvable and exciting. New images can be loaded and/or selected easily, and scores for various images can be tracked for different users to enable competition amongst various players. In some embodiments, the play experience can be enhanced by making the solution of certain puzzles a key to solving a broader puzzle, or enabling play of a new puzzle in a campaign style of play.

Figure 6:
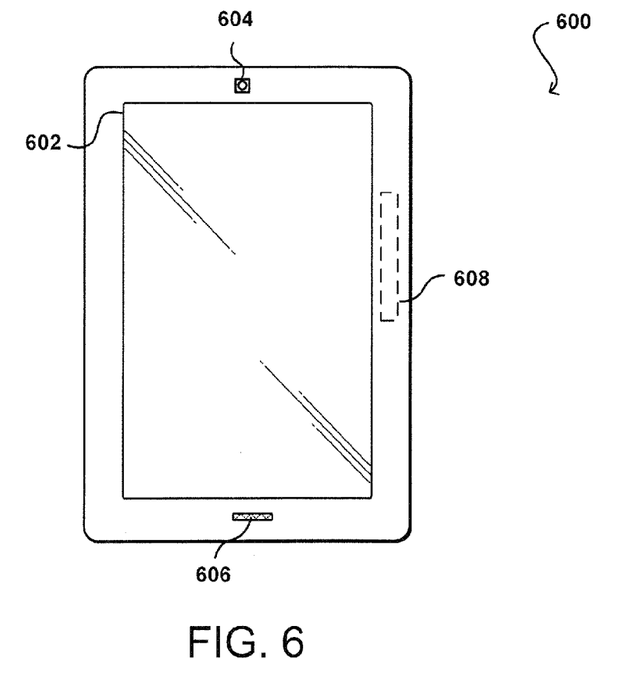
FIG. 6 illustrates an example computing device that can be utilized in accordance with various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The device can include at least one communication component 608 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The device also can include elements such as a light sensor and an illumination element, such as a white light or infrared (IR) LED for providing illumination to assist with image capture based at least in part upon current environmental conditions.

The example computing device 600 also includes at least one microphone, speaker, or other such audio element 606 capable of capturing and/or presenting audio data, such as words or commands spoken by a user of the device, sounds provided by a puzzle game, etc. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 7:
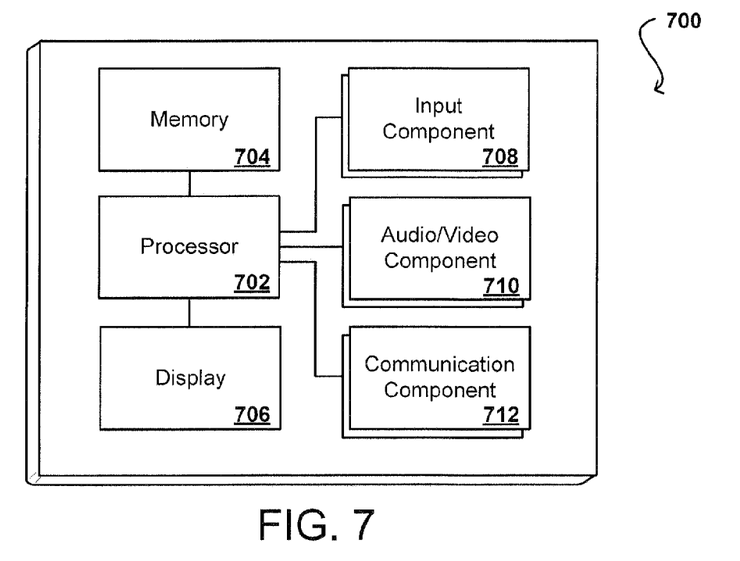
FIG. 7 illustrates an example set of components that can be utilized in a device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include one or more audio and/or video components 710 for capturing and/or presenting audio and/or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 of FIG. 7 can include one or more communication elements or networking sub-systems 712, such as a Wi-Fi, Bluetooth, RF, wired, or wireless communication system. The device in many embodiments can communicate with a network, such as the Internet, and may be able to communicate with other such devices. In some embodiments the device can include at least one additional input component 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

Figure 8:
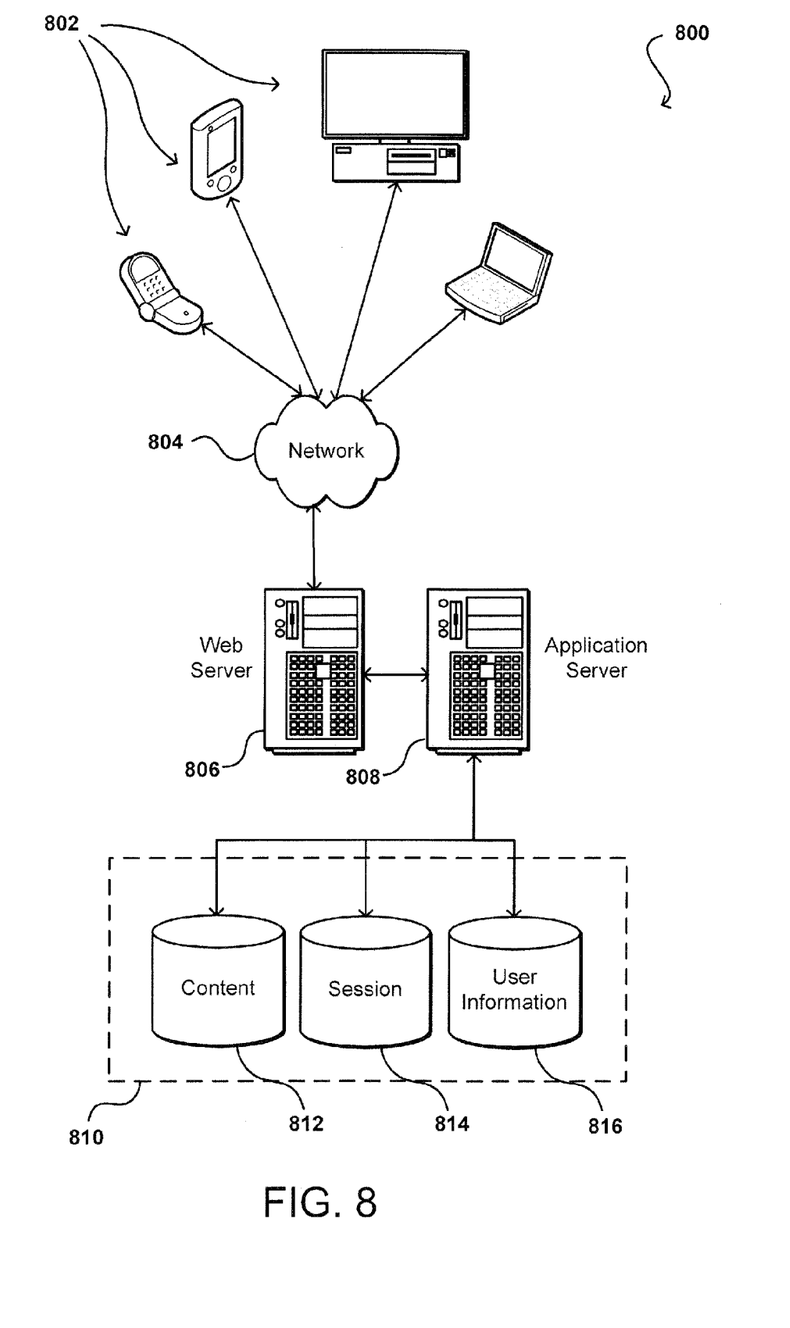
FIG. 8 illustrates an example an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing a jigsaw puzzle-type game, comprising:
   under control of one or more computing systems configured with executable instructions,
      obtaining an image to be used as a puzzle image as part of a jigsaw puzzle-type game;
      determining a first portion of the puzzle image to be displayed with a puzzle framework including a plurality of openings, and a plurality of second portions of the puzzle image to each be displayed with a respective puzzle tile of a plurality of puzzle tiles, each puzzle tile associated with one of the plurality of openings in the puzzle framework;
      displaying the puzzle framework and a subset of the plurality of puzzle tiles via a puzzle game interface enabling a user to move any of the subset of the plurality of puzzle tiles to any of the plurality of openings in the puzzle framework, the subset of the plurality of puzzle tiles being displayed in a tile rack region;
      in response to a player moving a puzzle tile to a location of one of the plurality of openings in the puzzle framework, determining whether the location corresponds to an opening associated with the puzzle tile;
      in response to the location corresponding to the opening associated with the moved puzzle tile:
         displaying the moved puzzle tile at the location of the opening, and
         displaying an additional puzzle tile in the tile rack region when at least one puzzle tile remains that is not displayed in the tile rack region or in an opening in the puzzle framework; and
      returning the moved puzzle tile to the tile rack region when the location does not correspond to the opening associated with the moved puzzle tile.

2. The computer-implemented method of claim 1, further comprising:
   notifying the user that the user has successfully completed the jigsaw puzzle-type game when all puzzle tiles have been placed in associated openings.

3. The computer-implemented method of claim 1, wherein obtaining the image to be used as the puzzle image includes obtaining the image from a library of images or receiving the image from the player.

4. The computer-implemented method of claim 1, wherein the image includes at least one of a still image, a set of still images, a stereoscopic image, a video, or an animation.

5. A computer-implemented method, comprising:
   under control of one or more computing systems configured with executable instructions,
      obtaining an image to be used as a puzzle image as part of a jigsaw puzzle-type game;
      providing for display a puzzle framework and a subset of a plurality of puzzle tiles as part of the jigsaw puzzle-type game, each of the plurality of puzzle tiles having a determined location in the puzzle framework, the puzzle framework and the plurality of puzzle tiles each displaying a portion of the puzzle image;
      enabling a player to move any of the displayed subset of the plurality of puzzle tiles to any of the determined locations in the puzzle framework;
      in response to determining a puzzle tile successfully placed in one of the determined locations:
      placing a remaining puzzle tile in the displayed subset of the plurality of puzzle tiles, and displaying an additional puzzle tile in a tile rack region when at least one puzzle tile remains that is not displayed in the tile rack region or in an opening in the puzzle framework; and
      notifying the player of successful completion of the puzzle when the plurality of puzzle tiles are each located at a respective determined location in the puzzle framework.

6. The computer-implemented method of claim 5, wherein each determined location in the puzzle framework corresponds to an opening shaped to receive a puzzle tile.

7. The computer-implemented method of claim 5, wherein the plurality of puzzle tiles each have the same shape and the same size.

8. The computer-implemented method of claim 7, wherein the plurality of puzzle tiles each have a shape selected from a group consisting of regular and irregular geometric shapes.

9. The computer-implemented method of claim 5, wherein an opportunity to successfully complete the puzzle ends when an amount of time on a puzzle timer expires.

10. The computer-implemented method of claim 5, wherein the player must successfully complete the puzzle to obtain a view of the selected puzzle image.

11. The computer-implemented method of claim 5, further comprising:

selecting at least one displayed puzzle tile as a bonus tile for a period of time; and rewarding the player with additional points when the player correctly places the bonus tile in the puzzle framework during the period of time.

12. The computer-implemented method of claim 5, wherein the image is a video presentation, and wherein each puzzle tile displayed and the puzzle framework each display a respective portion of playback of the video presentation during a gaming period of the puzzle.

13. The computer-implemented method of claim 5, further comprising:

notifying the player when the player successfully or unsuccessfully places a puzzle tile in the puzzle framework.

14. The computer-implemented method of claim 13, wherein notifying includes at least one of displaying a notification, providing haptic feedback, or playing an audio notification.

15. The computer-implemented method of claim 5, wherein a thickness of intermediate portions of the puzzle framework is selected to enable the player to determine where to place a puzzle tile based at least in part upon the portion of the puzzle image displayed at the intermediate portions.

16. A non-transitory computer-readable storage medium storing instructions for providing a puzzle game, the instructions when executed by at least one processor of a computing device causing the computing device to:

select an image to be used as a puzzle image and a puzzle framework for a jigsaw puzzle-type game;

provide for display the puzzle framework and a subset of a plurality of puzzle tiles, each of the plurality of puzzle tiles having a determined location in the puzzle framework, the puzzle framework and the plurality of puzzle tiles each displaying a portion of the selected puzzle image;

enable a player to move any of the displayed subset of puzzle tiles to any of the determined locations in the puzzle framework;

in response to determining a puzzle tile successfully placed in one of the determined locations:

placing a remaining puzzle tile in the displayed subset of puzzle tiles, and displaying an additional puzzle tile in a tile rack region when at least one puzzle tile remains that is not displayed in the tile rack region or in an opening in the puzzle framework; and notify the player of successful completion of the puzzle when the plurality of puzzle tiles are each located at a respective determined location in the puzzle framework.

17. The non-transitory computer-readable storage medium of claim 16, wherein the selection of at least one of the puzzle image or the puzzle framework is based at least in part on a skill level earned or selected by the player.

18. The non-transitory computer-readable storage medium of claim 17, wherein a thickness of intermediate portions of the puzzle framework is selected based at least in part upon the skill level.

19. The non-transitory computer-readable storage medium of claim 16, wherein each of the puzzle tiles is configured to snap to a nearest determined location in the puzzle framework when the player moves the puzzle tile across the puzzle framework.

20. The non-transitory computer-readable storage medium of claim 16, wherein selecting the puzzle image includes obtaining the puzzle image from a library of images or receiving the image from the player.

21. The non-transitory computer-readable storage medium of claim 16, wherein the puzzle image includes at least one of a still image, a set of still images, a stereoscopic image, a video, or an animation.

22. The non-transitory computer-readable storage medium of claim 16, wherein a shape of the puzzle framework includes at least one of a rectangular grid, a spiral grid, a wavy grid, a radial grid, a circular grid, or a three-dimensional grid.

* * * * *